United States Patent [19]
Göckler

[11] 3,879,071
[45] Apr. 22, 1975

[54] THREADED CONNECTION SEAL
[75] Inventor: Franz Josef Göckler, Olpe, Germany
[73] Assignee: Hubert Schell KG, Olpe, Germany
[22] Filed: Oct. 11, 1973
[21] Appl. No.: 405,596

[30] Foreign Application Priority Data
Oct. 11, 1972 Germany............................ 2249804
Dec. 12, 1972 Germany............................ 2260728

[52] U.S. Cl.................................. 285/347; 285/355
[51] Int. Cl............................................. F16l 17/02
[58] Field of Search .... 285/347, 349, 355, DIG. 14,
285/DIG. 20, DIG. 10, DIG. 11, 333;
277/DIG. 6, 227

[56] References Cited
UNITED STATES PATENTS
2,086,133  7/1937  Kennedy............................ 285/347
2,246,436  6/1941  Downey............................. 285/347
3,124,502  3/1964  Rodke............................ 277/227 X
3,508,771  4/1970  Duret.............................. 285/355

Primary Examiner—Dave W. Arola
Attorney, Agent, or Firm—Spencer & Kaye

[57] ABSTRACT

For sealing a connection between two parts having mating threads, the threaded portion of one part is provided with an annular groove whose base has a knurled surface, a sealing ring of glass fiber-reinforced plastic material having high cold-flow properties is seated in the groove, and the ring is chamfered at the edge remote from the groove base and disposed at the side of the ring which faces in the direction of engagement of the parts.

4 Claims, 8 Drawing Figures

THREADED CONNECTION SEAL

BACKGROUND OF THE INVENTION

The present invention relates to a seal for screw-threaded connectors in pipes, fittings or the like, particularly for arrangements in which an annular groove is provided in the threaded connector and a sealing ring of plastic material is embedded in the annular groove.

When installing pipes, fittings or the like, it is known to wrap their connector threads with hemp or sealing tape, to apply a bonding or jointing compound, and then to connect them to a duct for supplying a medium, in particular water, by screwing them onto a screw thread on the duct. This method is complicated and time-consuming.

It is also known, in order to seal a screw-threaded sleeve, to provide on its inner surface, in the region of a female thread, a groove with an inserted plastic ring, into which a male thread present on a pipe presses upon being screwed into the sleeve. Furthermore, a seal for pipe connections is also known, in which an annular groove is provided in an external pipe thread, in which groove an O-ring seal of circular cross section, of rubber or a rubber-like plastic material, is embedded. The outer diameter of the sealing ring is substantially the same as the outer diameter of the internal thread which is to mate with the external thread.

With these known seals, there is the risk that the sealing ring located in the annular groove will not remain in its prescribed position on screwing the threaded parts into one another and, instead, will be rotated in the tangential direction relative to the annular groove and thus displaced at least partly in the axial direction of the screw thread, which prevents a reliable seal from being obtained.

Finally, a pipe connection is known in which a groove fitted with a sealing ring is provided on the end of the internal thread of a sleeve, the base of the groove being milled or knurled. The sealing ring is of a light metal alloy. Upon screwing of the internal thread into a conical external thread provided on a pipe, the part of the sealing ring located over the annular groove extrudes into a space which is formed between the pipe and the free end of the sleeve, which free end has no thread in the region connected with the groove and so has an increased internal diameter. This type of seal is chosen in order to ensure an electrically conductive connection between the pipe and the sleeve. The sealing action is no longer ensured, however, if there is the slightest rotary movement between the pipe and the sleeve in the unscrewing direction.

SUMMARY OF THE INVENTION

It is an object of the present invention to eliminate many of the drawbacks of known seals.

Another object of the invention is to render impossible either rotation of the sealing ring in the annular groove or shifting of the sealing ring in the axial direction of the screw thread, even if the threaded connector has to be rotated several times either in the tightening or the loosening direction during installation of pipes, fittings, or the like.

According to the invention, these objects are achieved by providing a threaded connector having an annular groove with a knurled annular base, or bottom and a sealing ring of a temperature-resistant glass fiber-reinforced material having high cold-flow properties and chamfered, or beveled, at least at the front edge of the ring, which projects over the annular groove in the tightening direction. On screwing the threaded parts together, the bevel on the sealing ring embedded in the one threaded part first contacts the other threaded part with its leading surface. This ensures that the sealing ring is actively pressed into the base of the groove, in addition to being pressed thereby by its prestressed force, and is not shifted in the axial direction.

The risk of rotation of the sealing ring in the annular groove is thus minimized by the increased surface pressure and definitely avoided by the knurling at the base of the groove. The knurling thus increases the stability of the threaded part in the region of the groove, which is of importance since the threaded part has its smallest cross section in this region.

The material selected for the sealing ring increases the self-sealing effect. Because of its toughness, it rapidly resumes its original form after a short time, so that complete removal of the threaded connector from a pipe and its unaltered reconnection into a pipe are possible. In particular, however, any rotation in the tightening or loosening direction during installation of pipes, fittings or the like is possible without destroying the sealing effect. The sealing ring pressed into the base of the groove and also into the turns of the adjacent thread ensures a reliable sealing for all media, for example gas and air, and in particular for water. With the seal of the invention, a self-sealing effect is ensured in a simpler way and in a shorter time than was true for prior art arrangements.

From the structural standpoint, the self-sealing effect is increased, with an annular groove formed in an internal, or female, thread, if the outer diameter of the annular groove and of the sealing ring are greater than the outer, or root, diameter of the internal thread and the internal diameter of the sealing ring is smaller than the crest, or minor, thread diameter. With an annular groove formed in an external thread, the internal diameter of the annular groove and of the sealing ring is preferably smaller than the root diameter of the external thread and the external diameter of the sealing ring is preferably greater than the external, or crest, diameter of the external thread.

The stability of the thread in the region of the annular groove is further improved if the knurling is made as a double knurling, since then material remains at the base of the groove between its side walls in a waffle pattern. It is also advantageous to provide the sealing ring with a chamfer or bevel on both of its sides which extend away from the annular groove. This makes any sealing ring universally insertable irrespective of which side of a thread has to be screwed into another.

DESCRIPTION OF THE PREFERRED EMBODIMENTS

Figure 1A:
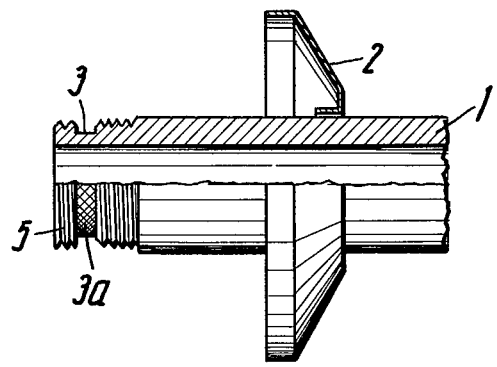
FIG. 1a is a partly elevational, partly cross-sectional side view of one embodiment of an externally threaded connector in accordance with the invention, with the sealing ring removed.

In each of the illustrated embodiments, a threaded pipe union 1, shown by way of example of a fitting, is provided in the vicinity of its free end with an external, or male, connecting thread 5 which can be screwed into an internal, or female, thread 8 of a sleeve 6. A cover member 2 for covering the connection can be pushed onto the threaded connector 1.

Figure 1B:
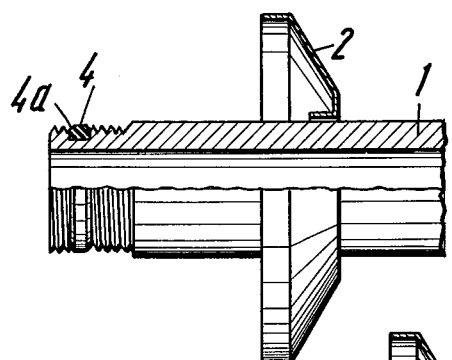
FIG. 1b is a view similar to that of FIG. 1a with the sealing ring in place.

In the embodiment illustrated in FIGS. 1a to 1d, the threaded pipe union 1 is constructed according to the invention to have an annular groove 3 with a knurled base 3a, best seen in FIG. 1a. As is shown, groove 3 is disposed intermediate the ends of the threaded portion occupied by thread 5, thread 5 being continuous between each end of the threaded portion and groove 3. A sealing ring 4 is pressed into the annular groove, as shown in FIG. 1b. The sealing ring 4 has a chamfer 4a at least on its forward edge remote from the annular groove base and disposed at the side of the ring which faces in the direction of tightening, the chamfer defining a frustoconical surface. The ring 4 is shown with a chamfer at both edges.

The sealing ring is made of a temperature-resistant, glass fiber-reinforced material, in particular a plastic material, having high cold-flow properties.

The internal diameter, i.e., the diameter of the base 3a, of the annular groove 3 and of the sealing ring 4 is smaller than the core, or root, diameter of the screw thread 5. The external diameter of the sealing ring 4 is greater than the crest diameter of the thread 5. The sealing ring 4 is inserted into the annular groove 3 while under a pretensioning force. It is enlarged, pushed over the front end of the thread 5 and then returns to its original shape on reaching the annular groove 3.

In the embodiment illustrated in FIGS. 2a to 2d, the connector of the invention is in the form of a sleeve 6 provided with an annular groove 13 with a knurled base 13a into which a sealing ring 14 is pressed. Here again, groove 13 is disposed intermediate the ends of the threaded portion defined by thread 8, thread 8 being continuous between each end of the threaded portion and groove 13. Again, the sealing ring has a chamfer 14a at least on its forward edge remote from the base of the annular groove 13, this being the edge disposed at the side of the ring which faces in the direction of tightening, and again consists of a temperature-resistant, glass fiber-reinforced material of high cold-flow properties. The external diameter of the annular groove 13 and of the sealing ring 14 is greater than the external, or root, diameter of the internal thread 8. The internal diameter of the sealing ring 14 is smaller than the core, or crest, diameter of the internal thread 8.

Figure 1C:
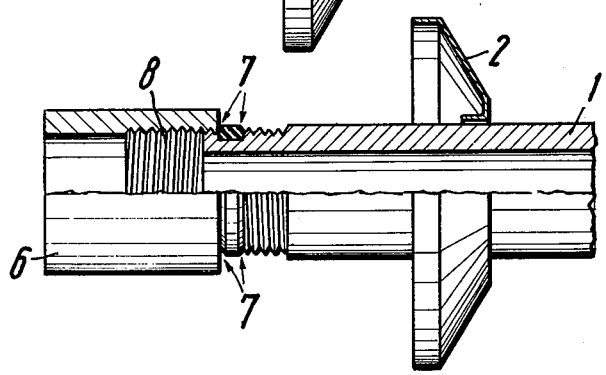
FIG. 1c is a view similar to that of FIG. 1b at the beginning of connection of the connector to an internally threaded sleeve.
Figure 1D:
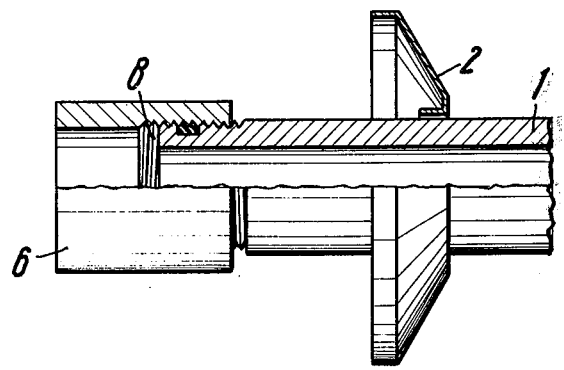
FIG. 1d is a view similar to that of FIG. 1a with the connection completed.
Figure 2A:
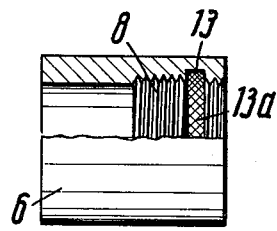
FIGS. 2a, 2b, 2c and 2d are views similar to those of FIG. 1a, 1b, 1c and 1d, respectively, for an embodiment of the invention in which the connector is in the form of an internally threaded sleeve.
Figure 2B:
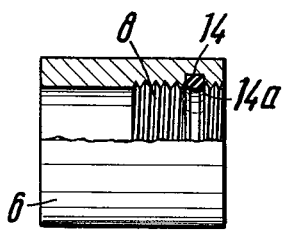
Figure 2C:
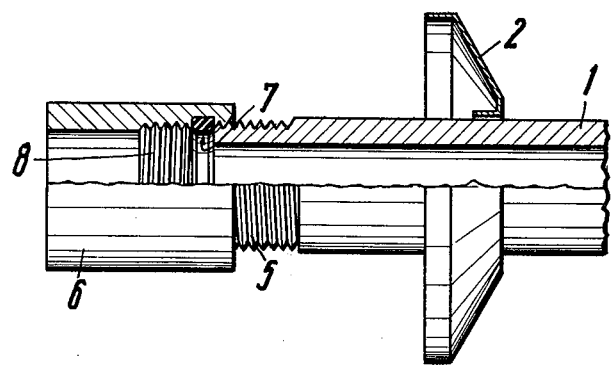

On screwing the threaded part 1 into the sleeve 6, on reaching the position indicated at 7, either, in the embodiment of FIG. 1c, the chamfer 4a of the sealing ring 4 inserted in the threaded part 1 contacts the front end of the sleeve 6, or, in the embodiment of FIG. 2c, the chamfer 14a of the sealing ring located in the sleeve 6 contacts the front end of the part 1. In order for the chamfer to contact the front end of the mating part 6 (FIG. 1) or 1 (FIG. 2), it is only necessary that the radial location of a point on the chamfer surface correspond to the radial location of that end of the thread on the mating part which first engages the threaded portion of the part in which the sealing ring is inserted.

The end face of sleeve 6 (FIG. 1c) or part 1 (FIG. 2c), by way of the chamfer 4a or 14a, respectively, then presses the sealing ring more strongly onto the base 3a or 13a of the annular groove 3 or 13. This prevents the sealing ring 4 or 14 from shifting in the axial direction of the thread. Also, the contact pressure on the groove base 3a or 13a, on which the knurling is provided, is increased. Thus, at the same time, shifting of the sealing ring 4 or 14 within the annular groove 3 or 13 in the tangential direction is prevented.

Figure 2D:
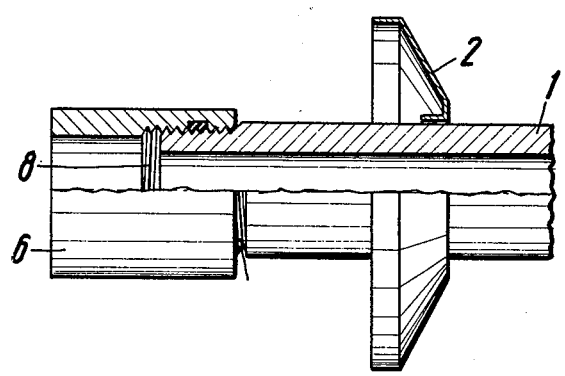

Furthermore, the sealing ring 4 or 14 rigidly pressed into the annular groove 3 or 13 is bevelled or extruded down into the start of the thread 8 in the sleeve 6 or into the start of the thread 5 in the threaded part 1 whereby, without any further sealing agent, a reliable sealing is made in a simple way between the threaded part 1 and the sleeve 6, as shown in FIGS. 1d and 2d, which also show that when part 1 and sleeve 6 are in full engagement, the entire region occupied by groove 3 or 13 is coextensive with a part of the mating thread 8 or 5, respectively.

It will be understood that the above description of the present invention is susceptible to various modifications, changes and adaptations and the same are intended to be comprehended within the meaning and range of equivalents of the appended claims.

I claim:

1. In a connecting member having a threaded portion arranged to engage a mating thread of a further connecting member to establish a sealed connection in a fluid conducting system, the threaded portion being provided with an annular groove disposed intermediate the ends of the threaded portion with the threaded portion presenting a continuous thread between each end thereof and the groove, the entire region occupied by the groove being coextensive with a part of the mating thread of the further connecting member when the connecting member and the further connecting member are in full engagement, and the connecting member including a sealing ring of plastic material seated in the groove, the improvement wherein: the base of said groove has a knurled surface; said sealing ring is of a temperature-resistant, glass fiber-reinforced material having high cold-flow properties; and said sealing ring presents a chamfer at the annular edge thereof which is remote from said groove base and which faces in the direction of engagement between said connecting member and such further connecting member, said chamfer defining a frustoconical surface, and the radial location of a point on the chamfer surface corresponding to the radial location of that end of the thread of the further connecting member which first engages said threaded portion of said connecting member, whereby said sealing ring is pressed against said knurled surface by the further connecting member to prevent rotation of said ring and said ring is caused to conform to the mating thread of the further connecting member during further engagement between the members, so that said ring sealingly engages both members.

2. An arrangement according to claim 1 wherein the knurled surface presents a double knurling.

3. An arrangement according to claim 1 wherein said sealing ring presents a chamfer at both annular edges remote from said groove base.

4. In a sealed joint composed of a first connecting member having a threaded portion, and a second connecting member having a thread mating with the threaded portion of the first connecting member to establish a sealed connection between the first and second connecting members in a fluid conducting system, the threaded portion of the first connecting member being provided with an annular groove disposed intermediate the ends of such threaded portion, with the threaded portion of the first connecting member presenting a continuous thread between each end thereof and the groove, the entire region occupied by the groove being coextensive with a part of the mating thread of the second connecting member when the first and second connecting members are in full engagement, and the first connecting member including a sealing ring of plastic material seated in the groove, the improvement wherein: the base of said groove has a knurled surface; said sealing ring is of a temperature-resistant, glass fiber-reinforced material having high cold-flow properties; and said sealing ring presents a chamfer at the annular edge thereof which is remote from said groove base and which faces in the direction of engagement between said first connecting member and said second connecting member, said chamfer defining a frusto-conical surface, and the radial location of a point on the chamfer surface corresponding to the radial location of that end of the thread of said second connecting which first engages the threaded portion of said first connecting member, whereby said sealing ring is pressed against said knurled surface by said second connecting member to prevent rotation of said ring and said ring is caused to conform to the mating thread of said second connecting member during further engagement between said first and second members, so that said ring sealingly engages both said first and second members.

* * * * *